United States Patent [19]

Millman et al.

[11] 4,078,573
[45] Mar. 14, 1978

[54] CLAMPING DEVICE INCORPORATING LOAD LIMITING MEANS

[75] Inventors: Robert Savile Millman, Nottingham; John Godfrey Morley, Little Eaton; Henry Thomas Ramsay, Castle Cary, all of England

[73] Assignee: National Research Development Corporation, London, England

[21] Appl. No.: 582,973

[22] Filed: Jun. 2, 1975

[30] Foreign Application Priority Data

Jun. 3, 1974  United Kingdom ............... 24507/74

[51] Int. Cl.² ...................... F16K 17/00; B65D 51/16
[52] U.S. Cl. .......................................... 137/67; 85/61; 220/89 A
[58] Field of Search .................. 85/61, 62; 137/67–71; 220/89 A, 85 T, 85 C, 327, 366; 285/1, 2

[56] References Cited

U.S. PATENT DOCUMENTS

| | | | |
|---|---|---|---|
| 1,394,072 | 10/1921 | Egbert | 220/89 A |
| 1,472,405 | 10/1923 | Amberton | 285/2 |
| 1,505,508 | 8/1924 | Trager | 285/2 |
| 1,723,389 | 8/1929 | Thiel | 85/62 X |
| 1,729,085 | 9/1929 | Pofeldt | 220/89 A |
| 2,685,812 | 8/1954 | Dmitrof | 85/61 |
| 3,280,689 | 10/1966 | Rubin | 85/61 |
| 3,319,643 | 5/1967 | Horn | 137/70 |
| 3,504,591 | 4/1970 | Christophersen | 85/61 |
| 3,667,339 | 6/1972 | Dame | 85/61 |
| 3,788,514 | 1/1974 | Giacoma et al. | 220/366 X |

FOREIGN PATENT DOCUMENTS

660,630   4/1963   Canada ..................................... 85/61

Primary Examiner—Martin P. Schwadron
Assistant Examiner—Richard Gerard
Attorney, Agent, or Firm—Cushman, Darby & Cushman

[57] ABSTRACT

An artefact is provided for use in cases where two bodies are to be connected together by load limiting means.

The artefact comprises one portion adapted to be connected rigidly with one of the bodies and a second portion to be associated with the other body and connected in pressure-sensitive or tension-sensitive relationship with the first portion by a connection which incorporates at least one load limiting means which consists of at least two members, one of which is adapted to deform when the load between the two portions exceeds a predetermined value so as to permit of relative movement between the two members.

Such artefact is useful in connection with the protection of pressure vessels from excessive build-up of internal pressure since the artefact may be used in securing a blow-off panel to the vessel.

3 Claims, 8 Drawing Figures

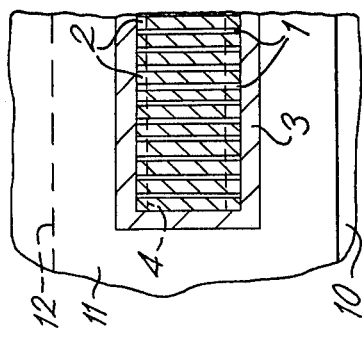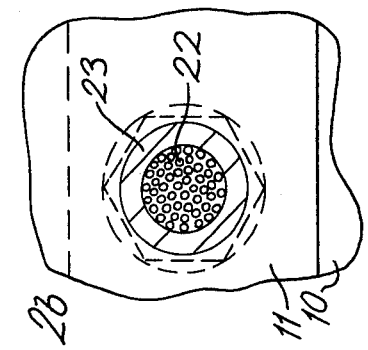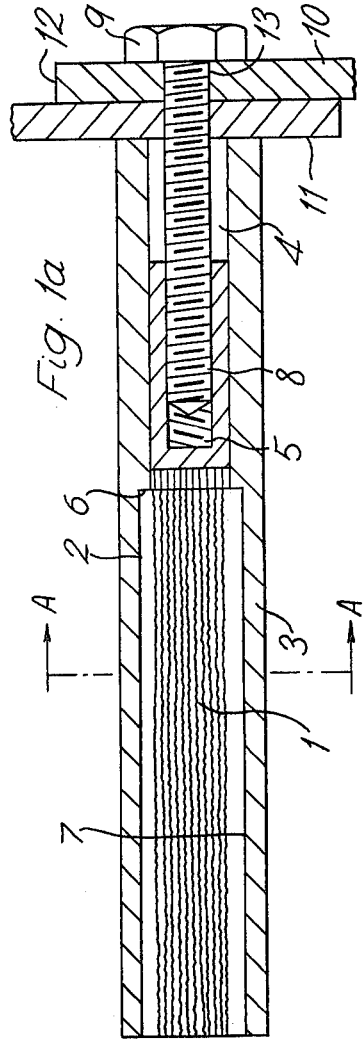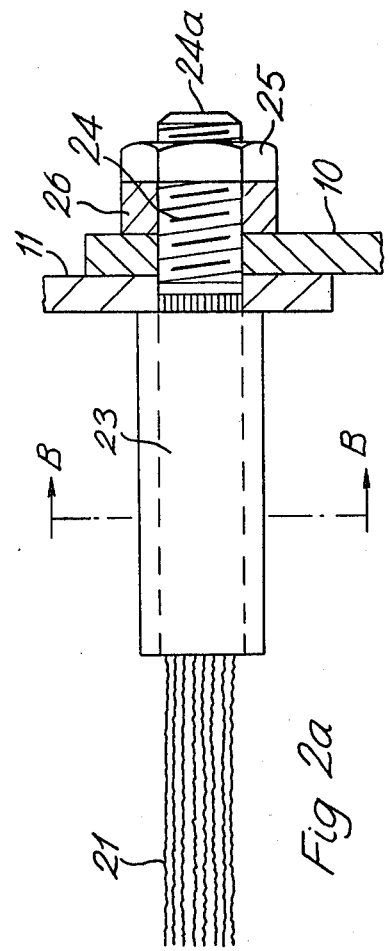

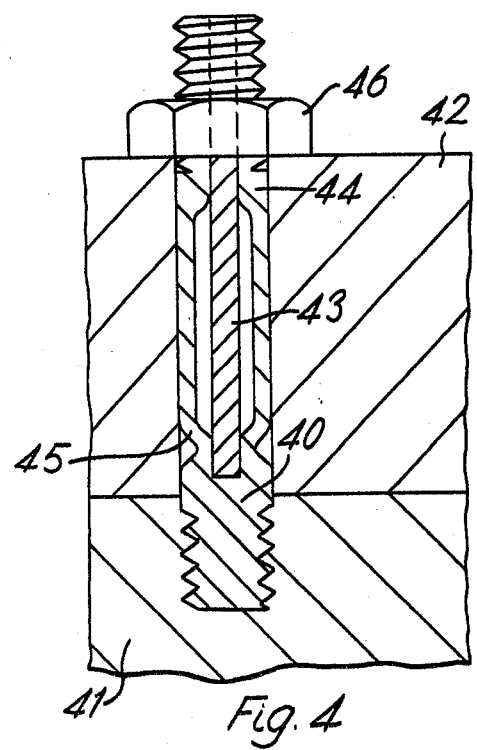
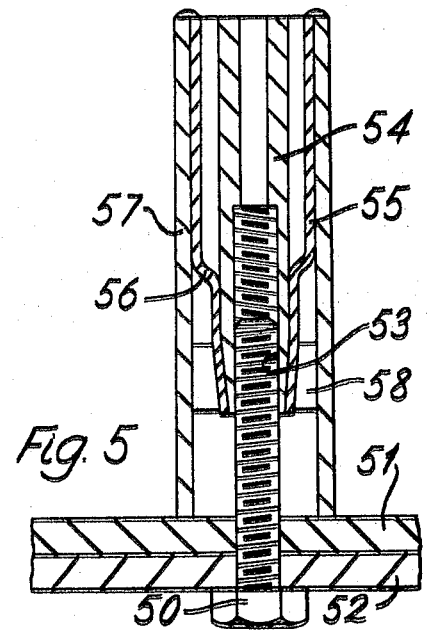

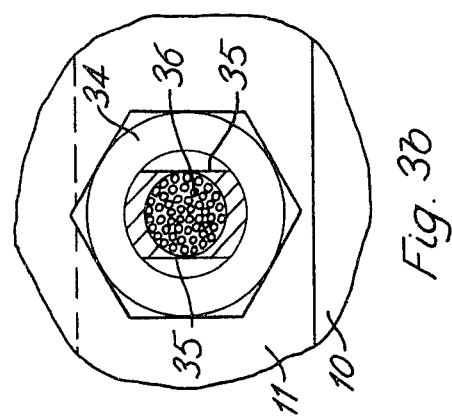
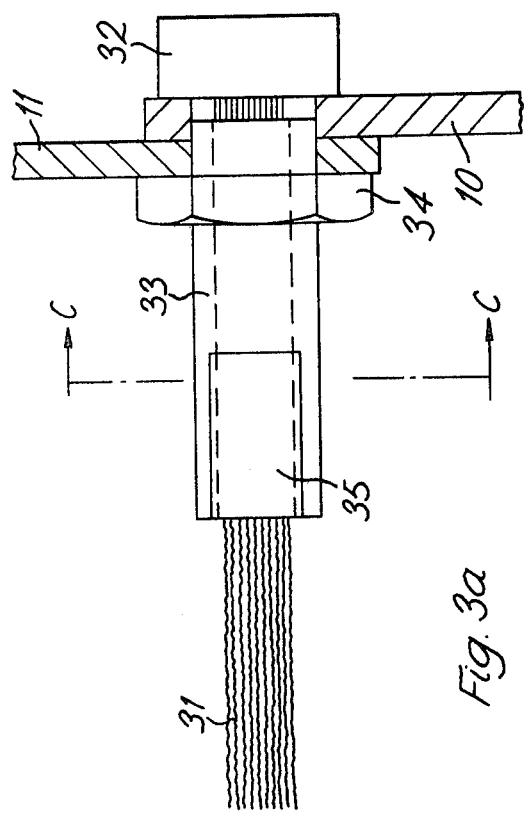

CLAMPING DEVICE INCORPORATING LOAD LIMITING MEANS

This invention relates to artefacts incorporating load limiting means.

In accordance with the invention an artefact comprises a portion adapted to be connected rigidly with a relatively fixed body and a second portion connected in pressure-sensitive or tension-sensitive relationship with the first portion, the said connection between the two portions incorporating at least one load limiting means which consists of at least two members, one of which is deformed when the load between the two portions exceeds a predetermined value so as to permit of relative movement between the two members.

Composite elements suitable for service as said load limiting means are, for example, described in U.S. Patent application No. 352,807 filed on Apr. 19, 1973 and now abandoned, and in U.S. Patent application No. 551,299, filed on Feb. 19, 1975.

Both of these applications are assigned to the assignee of the present application.

In accordance with another aspect of the invention an artefact for clamping one body to a second body comprises a first screw-threaded means for co-operation with a second threaded means to clamp said two bodies together, said first threaded means comprising at least one load limiting means which consists of at least two members, one of said members being adapted to be deformed when the clamping load between the two said threaded means exceeds a predetermined value, thereby to permit of movement of at least part of one said threaded means with respect to the other said threaded means without any substantial further increase in the said clamping load.

One form of artefact according to the invention may comprise a means which may be used to clamp a second body to another body under conditions where it is not desired to use more than a predetermined clamping force. In that case, the artefact may be in the form of a threaded bolt or stud, a nut on the bolt being used to clamp the one portion of the bolt against the one body and, at the same time, the load limiting means being adapted to allow the threaded part of the bolt to 'pull' with respect to the second portion when a particular tension has developed in the bolt or stud. Such a form of bolt or stud can be used to secure, say, a blow-off panel for use in protecting a pressure vessel against excessive build-up of internal pressure. Normally such protective panels have been more in the nature of bursting discs or shear discs which fail under excessive pressure. The known type of protective panel has had to rely very heavily on mechanical properties of the materials forming the bursting disc or the shear disc or fixing bolts; it has been difficult or impossible to calibrate the failure characteristics with any high degree of accuracy. In contrast, the invention provides a solution to this problem of protection which is capable of high accuracy in operation and which can, if necessary, also be capable of calibration.

According to a feature of the invention, a pressure relief panel is formed integrally, or unitarily, with a number of the hereinbefore described threaded stud members.

In order that the invention may be more clearly understood several embodiments thereof will now be described with reference to the accompanying drawings of which:

FIGS. 1a, 1b, 2a, 2b, 3a, and 3b illustrate diagrammatic cross-sections through devices which incorporate assemblies of crimped wires which extend through holes in portions of the device and which exert pressure on the walls of the holes in the manner of duplex fibres described in U.S. Patent application No. 352,807; and FIGS. 4 and 5 illustrate devices which incorporate dupile members similar in operation to the devices described in U.S. Pat. Application No. 551,299.

While the meaning of the terms "duplex" and "dupile" can be appreciated by the disclosures of Patent application Nos. 352,807 and 551,299 and from the embodiments of the invention hereinafter described, it will perhaps facilitate the understanding of the invention to define these terms at this point.

With respect to a duplex device, if a corrugated core is surrounded by a sleeve so that the tips of the corrugation are pressing on the inside of the sleeve, the two will be locked together by frictional forces. However, if force is now applied to the core so as to pull it out of the sleeve, the force will tend to straighten the core, thereby reducing the frictional forces between the core and the sleeve. This amounts to a simple feedback mechanism in which the core is allowed to move when subjected to a sufficiently high force so long as this force is maintained but is held firmly when subjected to forces below a certain critical value.

In a dupile device an outer cylindrical tube normally carries the tensile load. A straight cylindrical core, the diameter of which is considerably less than the internal diameter of the outer tube, runs inside the tube. If the tensile force exceeds that which can be supported by the tube, it tends to collapse inwards; however this collapse is arrested by the presence of the inner core and the tensile force is transmitted to the core via the frictional interface between the tube and the core.

FIGS. 1a and 1b, of which the latter is a cross-sectional view on the line AA in FIG. 1a, show a clamping device in which an assembly of rows of crimped wires 1 between spacer elements 2 is contained within a cavity in a rectangular casing member or nut member 3, the ends of the spacer elements bridging across the end of a smaller cavity 4 in the other end of the casing member. A block 5 is a sliding fit in the cavity 4 and the spacer elements, which may be of any suitable hard material, preferably steel, extend from the end 6 of the cavity 4 to the point 7 in the other cavity; the latter cavity extended, if desired, and as shown, to protect the free ends of the wires. The block 5 serves to anchor the other ends of the wires and is made with a screw-threaded recess 8 with which a bolt 9 engages.

The bolt 9 is shown as extending through a hole 13 in a plate member 10 and through a corresponding hole in a plate member 11 and the clamping device is assembled by slipping the bolt into the cavity 4 until it engages the recess 8 in the block 5. When the bolt is screwed into the recess the block 5 will be drawn towards the plate member 11 and the frictional forces between the wires 1 and the spacer elements 2 cause the casing (nut) member 3 to be moved with the block 5. After the end of the casing member comes into contact with the plate member 11 the latter will be brought together. Further turning of the bolt will cause the block 5 to exert increased tensional force on the ends of the crimped wires 1 which will, in consequence, deform in part so as to reduce the restraining forces at the interfacial contacts between the wires and spacer elements; the block 5 may then be drawn along the cavity against these frictional restraining forces. These frictional forces will be dependent inter alia on the number, the material and the degree of crimp of the wires and on the material and finish of the spacer elements, that is on the co-efficient of friction between the wires and spacer elements.

The design of the clamping device can be made, as will be obvious to those skilled in the art, to provide that the frictional forces resisting turning of the bolt are substantially uniform. For this purpose the crimped portions of the wires should extend right through the constricting part of the device and free tails should be provided, also, of the crimped portions. The clamping device therefore provides what is known as a fixed load clamp for connecting together two parts of an assembly. The function of such a clamp is well known.

It is estimated that if there are ten rows of twelve wired (piano wire 12 mwg, 0.73 mm diameter) helically crimped and having a free amplitude of 1.00 mm. and 8.00 mm. wavelength (i.e. approximately 3 crimps per inch), the spacing between the spacing elements being 0.90 mm., then a pull-through force of approximately 7000 lb. is created. It will be evident that a device similar to that illustrated may be used to clamp a pressure release cap on to a pressure vessel containing fluid under compression. Thus the plate member 10 may be part of the vessel wall, the hole in which may be represented by the edge 12, and the plate member 11 will then be the release cap. By providing a number of the clamping devices around the edge of the hole and by making the bolts captive to the vessel wall, the cap will be drawn against the vessel wall by the nut members 3 and to maintain it closed against internal pressure the characteristics of the device need to be suitably chosen. In this application of the clamping device it will probably be better to dimension the threaded portion of the bolt and of the engaging recess to enable the device to be tightened up without undue pulling of the wires between the spacer elements or to make other arrangements which avoid the case where the bolt is turned so much that the block 5 engages the wall of the cap 11. By arranging that the 'nut' assemblies are outside the vessel, it is possible to establish quite easily the onset of pull-through on tightening each bolt and it can be readily established that the design clamping load has been reached. Of course, it is necessary to ensure that there is ample clearance between the end of the block 5 and the cap wall so as to allow movement, though this may be small, of the cap with respect to the bolt. Excessive pressure in the vessel causes the cap to exert an additional force on each nut member 3 which in turn acts on the ends of the spacer elements bridging the end of the cavity 4. When the force is great enough, the frictional forces between the spacer elements and the wires are overcome and nut member 3 will move with respect to the wires, thus permitting the cap to lift off the vessel and the internal pressure to be relieved.

Similarly functioning devices are shown in FIG. 2a, 2b and 3a, 3b, the respective views of which are similarly related to those of FIGS. 1a and 1b;

FIG. 2b is a cross-sectional view on the line BB in FIG. 2a, and

FIG. 3b is a cross-sectional view on the line CC in FIG. 3a.

In FIGS. 2a and 2b, the wires 21 (piano wire 12 mwg, 0.73 mm. diameter) are crimped in one plane, the crimps having wavelength approximately 4 mm and amplitude 0.97 mm; these pass through holes of diameter 0.79 mm in tubes 22 and the crimps are, therefore, constricted within these tubes; the tubes 22 abut the end of the tube 23 through which the ends of the wires pass to be anchored in block 24. The anchor block is provided with a screw-threaded extension 24a which is engaged by a nut member 25. In this case the holes in the plate members 10 and 11 are sufficient to clear the anchor block, which is conveniently cylindrical. If the plate members are of sufficient thickness then the nut member 25 may act directly against the wall of the plate member 10 but preferably a washer member 26 is provided to prevent the nut member bottoming on the thread on bolt 24a; this is to avoid restricting the clamping force.

The functioning of this clamping device will be evident from the above description of the embodiment of FIGS. 1a and 1b.

In FIGS. 3a and 3b, the ends of the crimped wires 31 are anchored in a cylindrical block 32 which is of larger diameter than the hole through plate member 10. The crimped wires in this embodiment are passed through tubes 36 as in the embodiment of FIGS. 2a and 2b but in this case the retaining tube 33 is screw-threaded on its exterior surface. The clamping device is assembled by passing the ends of the wires and the retaining tube 33 through clearing holes in the two plate members and the device is secured by means of a nut member 34 which engages the thread on the retaining tube 33. Suitable flats 35 are provided on the retaining tube to enable the latter to be engaged by a spanner whilst the nut member 34 is being tightened up. Here again, in this embodiment, a constant load clamp feature can be arranged.

In the above embodiments, the anchoring of the wires may be effected by casting the ends into a suitable metal or polymer matrix or they may be looped around a series of bars which in turn may be mechanically connected to a suitable fixing member.

It is estimated that it is possible to achieve a pull-through load of about ten tons with an active duplex array of cross-sectional area of about 150 mm$^2$.

FIGS. 4 and 5 illustrate the application of the invention to the dupile construction as described in U.S. Patent application No. 551,299. These embodiments are of clamping arrangements for fixing together portions of an assembly under constant load.

In FIG. 4 a stud member 40 is screwed into a plate member 41 and extends through plate member 42 which it is desired to clamp to member 41. The stud member comprises a core 43 anchored at the bottom and tubular extension which has a screw-threaded upper end portion 44. The lower end 45 of the tubular extension is shaped to cause dupile deformation to commence at this point. The portion 44 is engaged by a nut member 46 which tightens down on to plate member 42 to clamp it to plate member 41. As the nut member continues to be tightened stress is developed in the tubular extension which eventually gives rise to the dupile deformation referred to. The tubular extension collapses first at the point 45 to engage the core 43 and, because of the interfacial friction between the collapsed portion and the core, more of the extension will collapse progressively as the nut member continues to be turned in the tightening direction. Such deformation will be substantially constant and the device therefore provides a means of fixed load clamping.

The embodiment shown in FIG. 5 is a nut-and-bolt clamping device. The bolt 50 passes through the plate members 51, 52 and engages a screw-threaded portion 53 in a core tube 54. The dupile deforming tubular member 55 is secured to the lower end portion of the core tube 54 and member 55 is shaped to ensure commencement of dupile deformation at point 56. The end of the member 55 is secured, as by welding or soldering, to the end of a reaction tube 57 which acts as a nut member to engage the plate member 51 when it is necessary for clamping purposes. Reaction means 58 are provided to prevent the core member rotating with the bolt 50. As relative movement between bolt 50 and the internally threaded core tube 54 occurs, member 55 progressively collapses in a manner similar to that described with respect to FIG. 4.

It will be evident that the dupile devices enable shorter overall length to be achieved than is possible with the duplex devices.

In these latter arrangements it may be convenient to arrange that a visual indication of achievement of the designed clamping force can be obtained by observing the onset of movement between the outer ends of members 44 and 43.

It is to be seen, generally, that the duplex embodiments illustrated in FIGS. 1a, 1b, 2a, 2b, 3a and 3b inclusive are likely to be large, though a high loading can be achieved which, by suitable design, can be variable in that the characteristics of load extension can be made variable during pull through. On the other hand the dupile embodiments, illustrated in FIGS. 4 and 5, are more inclined to be compact, constant load, short (probably) extension devices using low ductility strength material.

A device in accordance with the invention may be used to provide protection against over-pressure in vessels in which pressure may be too rapid to be relieved by movement of a safety cap against resistive forces designed for constant load. It will probably be desirable to provide for the force characteristics of the clamping devices to permit of rapid dropping of resistive load after a small movement under extension. Use can be made here of the invention described in U.S. Patent applicaton No. 326,356. By this means, the force resisting the outwards movement of the cap could, for example, first be made to fall rapidly to ensure rapid venting of the excess pressure and then to increase again to a high value in order to slow down and stop the movement of the cap after it had moved a suitable distance away from its seating on the pressure vessel. Alternatively, one or more clamping devices could be used to trigger the rapid opening of a large valve. One such latter arrangement could be a large flap valve held down by one or more of the present clamping devices operating the flap valve through a trigger mechanism. In this arrangement an energy absorbing link could be used to slow down and stop the movement of the valve at a suitable point.

We claim:

1. An artefact for clamping one body to a second body, said artefact comprising a screw-threaded means for co-operation with a second screw-threaded means to clamp said bodies together against a force tending to separate them, said first threaded means comprising at least one load limiting means which includes at least two mutually engaging members, one of said members being adapted to be deformed when the force applied to cause separation of said bodies exceeds a predetermined value, thereby to permit movement of at least part of one said threaded means with respect to at least part of the other said threaded means to permit parting of said bodies without any substantial further increase in the separating force.

2. An artefact as claimed in claim 1, wherein the first said screw-threaded means forms an integral part of a pressure relief, or blow-off, panel for sealing a pressure vessel against excessive build-up of internal pressure.

3. An artefact for clamping one body to a second body, said artefact including a first clamping means comprising a clamping portion joined to a screw-threaded portion through a deformable load-limiting means, said screw-threaded portion being adapted to cooperate with a screw-threaded second clamping means for applying a force through the clamping portion to clamp said bodies together between said clamping portions, said force being limited by the load-limiting means, wherein said load-limiting means includes at least two mutually engaging members, one of said members being adapted to be deformed when a force tending to separate said bodies exceeds a predetermined value thereby permitting at least partial separation of the two bodies.

* * * * *